T. A. EDISON.
PROCESS AND APPARATUS FOR ARTIFICIALLY AGING OR SEASONING PORTLAND CEMENT.
APPLICATION FILED MAR. 23, 1908.
944,481.
Patented Dec. 28, 1909.
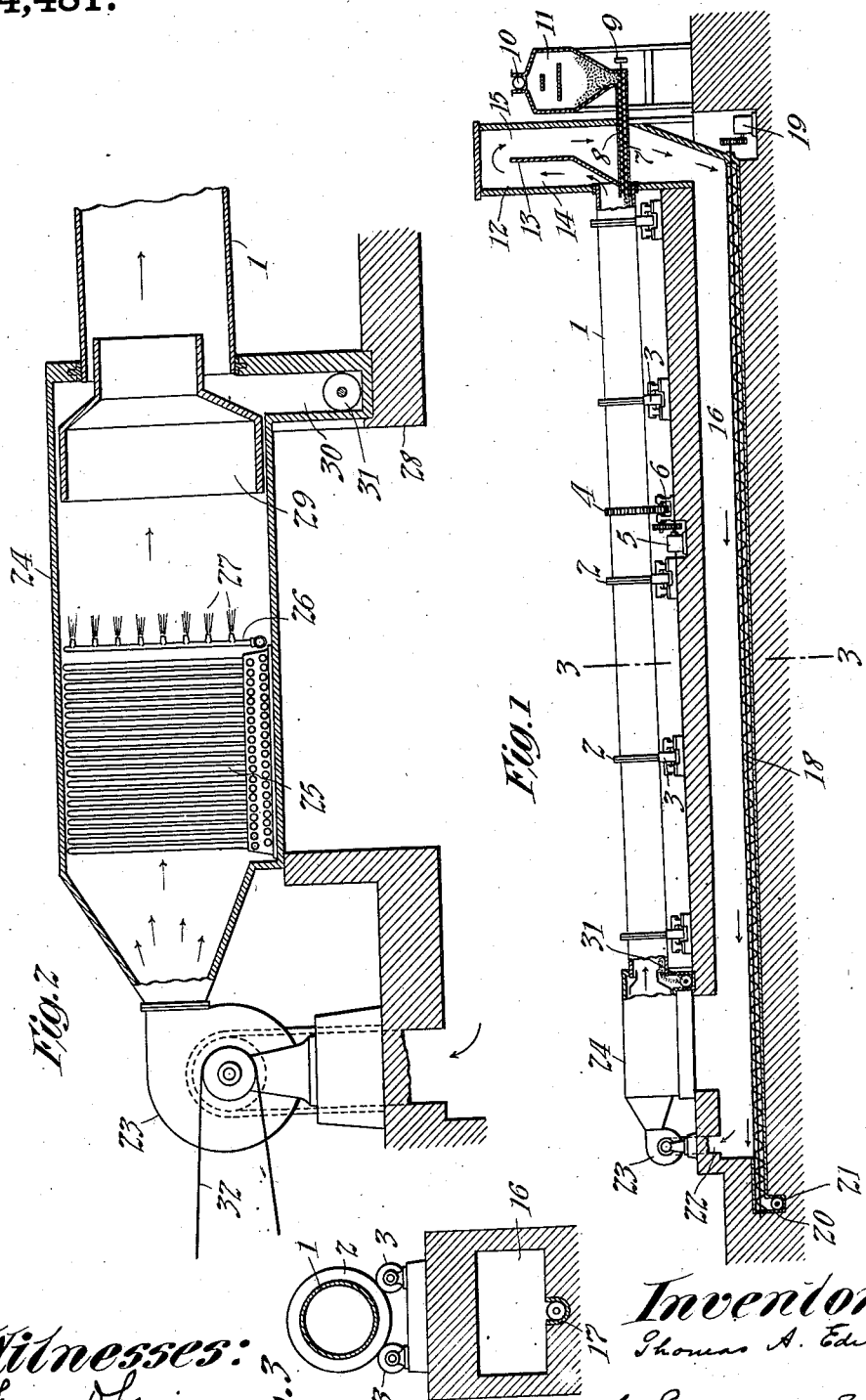

UNITED STATES PATENT OFFICE.

THOMAS A. EDISON, OF LLEWELLYN PARK, ORANGE, NEW JERSEY, ASSIGNOR TO EDISON PORTLAND CEMENT COMPANY, OF STEWARTSVILLE, NEW JERSEY, A CORPORATION OF NEW JERSEY.

PROCESS AND APPARATUS FOR ARTIFICIALLY AGING OR SEASONING PORTLAND CEMENT.

944,481.    Specification of Letters Patent.    Patented Dec. 28, 1909.

Application filed March 23, 1908. Serial No. 422,649.

*To all whom it may concern:*

Be it known that I, THOMAS A. EDISON, a citizen of the United States, and a resident of Llewellyn Park, Orange, in the county of Essex and State of New Jersey, have invented certain new and useful Improvements in Processes and Apparatus for Artificially Aging or Seasoning Portland Cement, of which the following is a description.

Under the present practice, in the manufacture of Portland cement, the freshly ground material is stored in a suitable stock house and is permitted to age or season until it is in condition to be used in construction work or to be submitted to the ordinary tests. Obviously, the absorption of atmospheric moisture is a very slow operation, depending entirely upon the temperature and hygroscopic condition of the air, so that the operation is exceedingly slow and the quality of the cement is likely to vary within considerable limits.

The object of my invention is to provide a process and apparatus by which this treatment may be performed artificially so that the seasoning or aging of the cement may be effected within a short time. At the same time the operations are under such exact control that the quality of the product may be regulated within very close limits and the raw material may be treated absolutely independently of the weather conditions, which factor does not need to be considered in the carrying out of the invention.

In order that the invention may be more fully understood, reference is made to the accompanying drawing, of which—

Figure 1 is a side elevation, partly in section, of an apparatus suitable for carrying out my improved process; Fig. 2 is a detail sectional view of the chamber shown at the left in Fig. 1; and Fig. 3 is a section on line 3—3 of Fig. 1.

In the apparatus shown, 1 is an elongated slightly inclined hollow cylinder formed of a series of sections having flanges 2, secured together, and supported upon rollers 3, said cylinder being provided with a gear 4, adapted to be driven by the motor 5, through the gearing 6, whereby the cylinder 1 is rotated slowly and in a manner similar to a rotary cement kiln, which it resembles in size and shape. The material to be treated consisting usually of freshly ground or crushed cement clinker, is fed into the upper end of the cylinder 1, by a screw conveyer 7, which occupies a horizontal tube 8, the inner end of which extends into the end of the cylinder 1 in close proximity to the bottom thereof. The conveyer 7 may be continuously driven by a belt applied to the pulley 9 and material is continuously supplied thereto by a conveyer 10 which discharges into the feed receptacle 11, the bottom of which communicates with the outer end of the conveyer 7. The upper end of the cylinder 1 communicates with a chamber 12 having a partition 13 which divides the same into ascending and descending flues 14 and 15, the lower end of the flue 15 opening into a horizontal flue or settling chamber 16, of greater cross-section than the interior of the cylinder 1. The bottom of said settling chamber is formed with a longitudinal trough 17 within which is a spiral conveyer 18, driven by the motor 19. Below the discharge end of the conveyer 18 is a transverse trough 20 and conveyer 21 for removing the deposited material from the settling chamber.

The exit end of the settling chamber 16 communicates through a passage 22 with the interior of a rotary exhaust fan or blower 23 which delivers a blast into the chamber 24. Within this chamber and extending across the path of the blast is a set of steam pipes or coils 25, and beyond said steam pipes is a pipe 26, for admitting steam into said chamber in the form of a series of jets 27. The chamber 24 is stationary and rests upon the foundation 28. In its forward end is a shouldered pipe 29, for reducing the cross-section of the blast, the contracted end of said pipe extending into the lower end of the rotary cylinder 1, which end fits within a circular opening formed in the end of the chamber 24. Below the pipe 29, and communicating with the end of the cylinder 1, is a discharge chamber 30, for receiving material delivered by the cylinder 1, and at the bottom of said chamber 30 is a screw conveyer 31 for continuously removing the material therefrom.

My improved process may be carried out with the apparatus shown, in the following manner: The cylinder 1 is continuously rotated and ground Portland cement is continuously introduced into the upper end thereof, by the conveyer 7. The blower 23 is continuously driven by a belt 32, and supplies a blast of air to the chamber 24. The air blast passes around and between the pipes 25 which are heated by steam passing therethrough, and steam is admitted to the hot blast from the jets 27. The gases, consisting of hot air, substantially saturated with water vapor, pass through the contracted end of the pipe 29 into and through the cylinder 1, along which the ground cement is passing in a continuous body, by reason of the rotation and inclination thereof. The cement is showered through the hot gases, being carried up from the bottom of the kiln, on account of its rotation, until it falls from the side of the kiln to the bottom, whereby the fine particles are thoroughly exposed to the action of the heated gases passing through the cylinder. The bulk of material passes through the cylinder from its upper to its lower end, discharging in a continuous stream into the chamber 30 from which it is removed by the conveyer 31. A considerable percentage of the ground material is, however, carried by the blast through the flues 14 and 15, into the settling chamber 16, where, on account of its increased cross-section, the velocity of the blast is checked and the material settles to the bottom of said chamber, and is removed therefrom continuously by the conveyers 18 and 21. The heated air from which the moisture has been extracted by the ground cement, then passes through the passage 22 and enters the blower 23, by which it is driven through the apparatus again in the same manner as before. The air passing through the blower is still at a high temperature and therefore there is an economy effected in the amount of heat which must be supplied by the steam pipes 25 since the same particles of air are used over and over again, only such fresh air being used as is necessary to balance the air lost through leakage, the fresh air being drawn in automatically by the blower 23. The temperature of the air may be regulated by the steam pipes 25 and should be between 150 and 250 degrees F., preferably about 200° F., as it leaves the chamber 24. The material removed from the apparatus by the conveyers 31 and 21 may be discharged into a storage warehouse where it is held a sufficient time to permit a reduction of the amount or degree of exterior hydration of the particles by a slow hydration of the interior thereof by a sort of cementation or progression inward.

Having now described my invention, what I claim is:

1. A process for artificially aging or seasoning Portland cement, which consists in moving a mass of the ground cement in one direction, agitating it, and passing therethrough a continuous current of heated moist air moving in the opposite direction, substantially as set forth.

2. A process for artificially aging or seasoning Portland cement, which consists in impelling a continuous current of heated moist air in one direction, showering continuously therethrough a mass of the ground cement, and feeding the same in the direction opposite to that of the air, substantially as set forth.

3. A process for artificially aging or seasoning Portland cement which consists in impelling a continuous current of air around a closed path and causing said air to pass over or through a body of ground cement during its travel around said path, substantially as set forth.

4. A process for artificially aging or seasoning Portland cement which consists in impelling a continuous current of air around a closed path, heating said current of air and causing the same to pass over or through a body of ground cement during its travel around said path, substantially as set forth.

5. A process for artificially aging or seasoning Portland cement which consists in impelling a continuous current of air around a closed path, heating and introducing water vapor into said current of air, and causing the same to pass over or through a body of ground cement, during its travel around said path, substantially as set forth.

6. A process for artificially aging or seasoning Portland cement, which consists in impelling a continuous current of air around a closed path, heating and introducing water vapors into said current of air, causing the same to pass over or through a body of ground cement during its travel around said path, and causing the cement to travel in the direction opposite to that of the air, substantially as set forth.

7. A process for artificially aging or seasoning Portland cement which consists in impelling a continuous current of air around a closed path, causing said air to pass over or through a body of ground cement during its travel around said path, and checking the velocity of said air current during its travel through a portion of its path to permit the settling of the particles of cement carried thereby, substantially as set forth.

8. In an apparatus of the character described, the combination of an elongated tube adapted to contain a body of ground cement, means for feeding material into one end thereof, and means for passing a current of heated air and water vapor therethrough, in contact with said material, substantially as set forth.

9. In an apparatus of the character described, the combination of an elongated tube adapted to contain a body of ground cement, means for feeding material into one end thereof, means for passing a current of heated air and water vapor therethrough in contact with said material, and a settling chamber communicating with the outlet of said tube, substantially as set forth.

10. In an apparatus of the character described, the combination of an elongated tube adapted to contain a body of ground cement, means for feeding material into one end thereof, means for passing a current of heated air and water vapor therethrough in contact with said material, and means for rotating said tube, substantially as set forth.

11. In an apparatus of the character described, the combination of an elongated tube adapted to contain a body of ground cement, means for feeding material into one end thereof, means for passing a current of heated air and water vapor therethrough in contact with said material, a settling chamber extending substantially parallel to said tube and connected with both ends thereof, substantially as set forth.

12. In an apparatus of the character described, the combination of an elongated tube adapted to contain a body of ground cement, means for feeding material into one end thereof, means for passing a current of heated air and water vapor therethrough in contact with said material, a settling chamber extending substantially parallel to said tubular bore and connected with both ends thereof, and means for impelling said air current situated between the outlet of said settling chamber and the inlet of said tube, substantially as set forth.

13. In an apparatus of the character described, the combination of an elongated tube adapted to contain a body of ground cement, means for feeding material into one end thereof, means for passing a current of heated air and water vapor therethrough in contact with said material, a settling chamber extending substantially parallel to said tube and connected with both ends thereof, and means for impelling and heating said air situated between the outlet of said settling chamber and the inlet of said tube, substantially as set forth.

This specification signed and witnessed this 13th day of March 1908.

THOS. A. EDISON.

Witnesses:
  FRANK L. DYER,
  ANNA R. KLEHM.